(12) United States Patent
Kulandaivel et al.

(10) Patent No.: US 12,308,993 B2
(45) Date of Patent: May 20, 2025

(54) SYSTEM AND METHOD FOR GENERATING RANDOM NUMBERS WITHIN A VEHICLE CONTROLLER

(71) Applicant: Robert Bosch GmbH, Stuttgart (DE)

(72) Inventors: Sekar Kulandaivel, Silver Spring, MD (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 781 days.

(21) Appl. No.: 17/445,758

(22) Filed: Aug. 24, 2021

(65) Prior Publication Data

US 2023/0072454 A1    Mar. 9, 2023

(51) Int. Cl.
*H04L 12/40* (2006.01)
*H04L 9/08* (2006.01)

(52) U.S. Cl.
CPC ............ *H04L 12/40* (2013.01); *H04L 9/0869* (2013.01); *H04L 2012/40215* (2013.01); *H04L 2012/40273* (2013.01)

(58) Field of Classification Search
CPC ... H04L 63/168; H04L 9/3271; H04L 9/0662; H04L 12/40; H04L 9/0869; H04L 63/108; H04L 2012/40273; H04L 67/12; H04L 2209/84; H04L 2012/40215
See application file for complete search history.

(56) References Cited

U.S. PATENT DOCUMENTS

| | | | |
|---|---|---|---|
| 9,383,969 B2 | 7/2016 | Van Der Sluis et al. | |
| 2005/0151619 A1* | 7/2005 | Forest | G07C 9/00309 340/5.72 |
| 2007/0118752 A1 | 5/2007 | Kiessling et al. | |
| 2014/0016781 A1 | 1/2014 | Geiger et al. | |
| 2014/0059648 A1* | 2/2014 | Danev | H04L 63/08 726/3 |
| 2017/0093866 A1* | 3/2017 | Ben-Noon | H04W 12/068 |
| 2017/0098172 A1* | 4/2017 | Ellenbogen | H04L 43/04 |

(Continued)

FOREIGN PATENT DOCUMENTS

| | | |
|---|---|---|
| EP | 3148236 A1 | 3/2017 |
| KR | 20180101004 A | 9/2018 |

OTHER PUBLICATIONS

Miller, et al., "Remote exploitation of an unaltered passenger vehicle," Black Hat USA, Aug. 10, 2015, 91 pages.

(Continued)

*Primary Examiner* — Oussama Roudani
(74) *Attorney, Agent, or Firm* — Brooks Kushman P.C.

(57) ABSTRACT

A system and method is disclosed for generating a pseudo-random number to prevent unauthorized access to an application-layer communication protocol (e.g., Unified Diagnostic Service protocol) within a vehicle. A first controller within the vehicle may be selected as a security server (e.g., SecurityAccess server). A second controller may be selected that may be in operable communication with the first controller over a shared bus network (e.g., Communication Area Network). A response time-based, voltage-based, or random walk-based algorithm may be employed to generate a pseudo-random number. It is contemplated the pseudo-random number may be generated as a challenge when access is being requested through the application-layer communication protocol.

20 Claims, 9 Drawing Sheets

(56) References Cited

U.S. PATENT DOCUMENTS

2017/0324579 A1\* 11/2017 Takada .............. H04L 12/40052
2017/0331795 A1 11/2017 Martin et al.
2023/0087540 A1\* 3/2023 Tanji .................. H04L 63/1416
726/23

OTHER PUBLICATIONS

Van Den Herrewegen, et al., "Beneath the Bonnet: A Breakdown of Diagnostic Security," In: Lopez et al. (eds), Computer Security, European Symposium on Research in Computer Security (ESORICS), 2018, Lecture Notes in Computer Science, vol. 11098, Springer, Cham. https://doi.org/10.1007/978-3-319-99073-6_15, 20 pages.

Barker et al., "Random Bit Generation Special Publications," National Institute of Standards and Technology (NIST): Computer Security Resource Center (CSRC), (2012), Created May 24, 2016, Updated Jun. 22, 2020, url: https://csrc.nist.gov/projects/random-bit-generation, accessed Jul. 20, 2021, 4 pages.

International Search Report and Written Opinion of PCT/US2022/041221, mailed Jan. 18, 2023, 8 pages.

\* cited by examiner

| Vehicle 1 | | | Vehicle 2 | |
|---|---|---|---|---|
| Freq. | Challenge | | Freq. | Challenge |
| 266 | 008040 | | 256 | 0BD79A04 |
| 260 | 0080C0 | | 207 | FBD69A04 |
| 115 | 018040 | | 160 | 53D79A04 |
| 131 | 0180C0 | | 143 | EDD69A04 |
| 60 | 038140 | | 53 | 07D79A04 |
| 51 | 0381C0 | | 38 | EBD69A04 |
| 30 | 078341 | | 34 | E5D69A04 |
| 27 | 0783C1 | | 30 | B3D69A04 |
| 19 | 0F8743 | | 22 | 81D79A04 |
| 9 | 0F87C3 | | 16 | F9D69A04 |

300 — Vehicle 1
302 — Vehicle 2

FIG. 3

SYSTEM AND METHOD FOR GENERATING RANDOM NUMBERS WITHIN A VEHICLE CONTROLLER

TECHNICAL FIELD

The present disclosure relates to improving the security within a vehicle when access to a controller is requested.

BACKGROUND

Conventional vehicles typically employ a controller area network ("CAN") bus which may operate as the central communication network in several modern systems such as automotive systems, aerospace systems and industrial systems. It is contemplated the addition of remote interfaces to some nodes on the CAN bus has opened numerous systems to unauthorized access or attacks. Over the past decade, attacks and authorized access on passenger vehicles has been successfully demonstrated. Improved security of computing systems (e.g., the CAN bus) may therefore be desirable.

SUMMARY

A system and method is disclosed for generating a random number to prevent unauthorized access to an application-layer communication protocol (e.g., Unified Diagnostic Service protocol) within a vehicle. A first controller within the vehicle may be selected as a security server (e.g., SecurityAccess server). A second controller may be selected that may be in operable communication with the first controller over a shared bus network (e.g., Communication Area Network). A plurality of request messages may then be transmitted from a first controller over the shared bus network to a second controller until the first controller has generated a response time distribution (e.g., normal distribution). The first controller may be operable to calculate a plurality of transmission times based on the difference between a start time when each of the plurality of request messages is transmitted and a completion time when a plurality of response messages corresponding to the plurality of request messages is received. One more of the transmission times may then be selected within the response time distribution as an input seed to a cryptographic algorithm operable to generate the pseudo-random number. It is contemplated the cryptographic algorithm may be a pseudo-random number generator or a randomness extractor. Lastly, the pseudo-random number may be generated as a challenge when access is being requested through the application-layer communication protocol.

It is contemplated an alternative method and system may be employed for generating a random number to prevent unauthorized access to an application-layer communication protocol within a vehicle. In the alternative, a plurality of instantaneous energy values for an energy source within the vehicle may be sampled until the first controller determines the plurality of instantaneous energy values have exceeded a predetermined value indicating an entropy pool has been created. One more of the plurality of instantaneous energy values within the entropy pool may then be selected as an input seed to a cryptographic algorithm operable to generate the pseudo-random number. The random number may be provided as a challenge when access is being requested through the application-layer communication protocol. It is contemplated the cryptographic algorithm may be further operable to mix one or more bytes of the entropy pool.

It is contemplated another alternative method and system may be employed for generating a pseudo-random number to prevent unauthorized access to an application-layer communication protocol within a vehicle. It is contemplated aa first runtime value may be sampled to derive a preliminary challenge, wherein the preliminary challenge is used to calculate a runtime threshold. One or more subsequent runtime values may also be sampled until the runtime threshold is exceeded. The one or more subsequent runtime values may be used as an input seed to a cryptographic algorithm operable to generate the pseudo-random number. The pseudo-random number may be provided as a final challenge when access is being requested through the application-layer communication protocol. It is also contemplated a non-volatile memory may be used to store the final challenge as a plaintext value or hash value.

BRIEF DESCRIPTION OF THE DRAWINGS

FIG. 3 are exemplary charts illustrating the potential frequency of challenge request responses.

DETAILED DESCRIPTION

Figure 1:
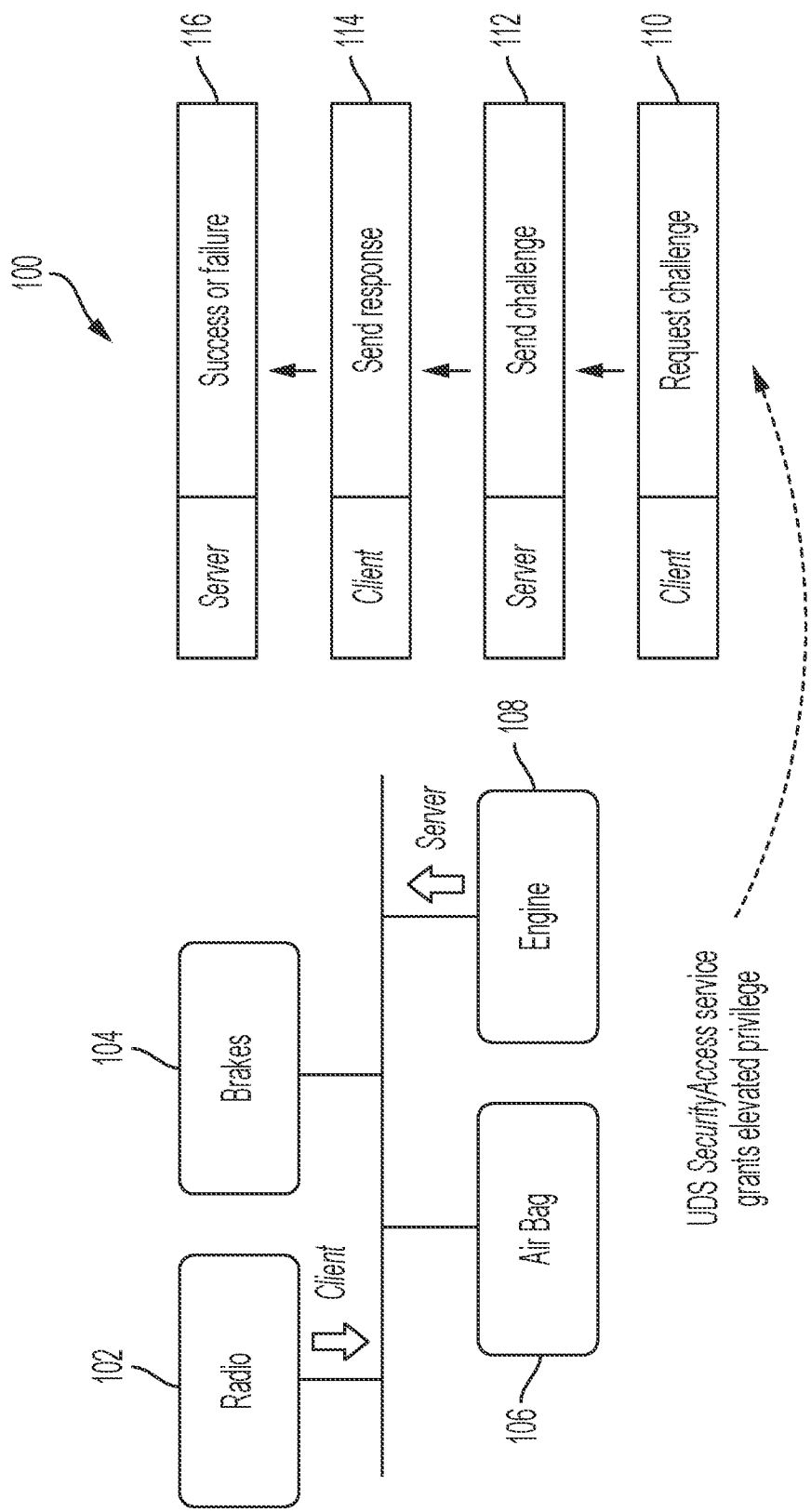
FIG. 1 illustrates an exemplary block diagram of implementation of a Unified Diagnostic Service ("UDS") SecurityAccess service.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A Controller Area Network (CAN) bus is one known network protocol that may be used as a central communication network in modern systems including automotive, aerospace, and industrial systems. Recent additions of various remote interfaces for some nodes on the CAN bus has opened various systems to remote attacks (e.g., hacks) from unauthorized users. Because attacks to the CAN bus (or other known bus protocols) have been successfully demonstrated improved security measures may be desirable.

For instance, to permit diagnostic access for an authorized service technician companies (e.g., Original Equipment Manufacturers (OEM)) may implement an application-layer protocol such as Unified Diagnostic Service (UDS). Such a protocol may offer access to privileged UDS commands after a technician's test device authenticates with a control unit like an Electronic Control Unit (ECU). Such an authentication may be implemented using known UDS services like SecurityAccess or Authentication. Such UDS services may be referred within ISO-14229 as "0x27" or "0x29." Commercially available or employed ECUs may use the SecurityAccess service to employ symmetric key cryptography thereby requiring a lower amount of processing power. It is also contemplated recent versions of ISO-14229 generally provide the Authentication Service as a public-key infrastructure.

It is also contemplated the SecurityAccess service may use a challenge-response authentication were both a tester and controller (e.g., ECU) may be required to have a shared secret key and shared encryption algorithm. Such an authentication may require the controller to produce a challenge that may require the tester to use with the shared secret key and encryption algorithm to compute a correct response. For instance, vehicle manufacturers (such as OEMs) may use the same shared key and encryption algorithm across multiple instances of vehicles for a given vehicle make and model (e.g., Toyota Prius or Ford Mustang). Using the same shared key and encryption algorithm across vehicle platforms may allow an unauthorized user the ability to reverse engineer the software on either a tester device or target ECU to extract the shared secret key and algorithm. The unauthorized user may therefore be able to gain access via the SecurityAccess service.

It is therefore contemplated conventional protocols (e.g., Unified Diagnostic Service Protocol) may include authentication mechanisms to help defend against unauthorized access to nodes connected to the CAN. Again, these protocols are intended to ensure unauthorized users are not allowed access without prior knowledge of the secret key and/or the associated encryption algorithm. The deployed algorithm may rely on the generation of strong random numbers to protect the system. For instance, the algorithm may protect the system from a "replay attack" where a valid data transmission across a network (e.g., CAN) may be maliciously or fraudulently repeated or delayed. In a replay attack, the unauthorized user may intercept data on the network and then re-transmit the data.

It is contemplated that commercially deployed ECUs may not be operable to produce sufficiently random numbers to prevent known or even new and/or more sophisticated attack methods. As such, currently deployed ECUs may not be operable to sufficiently generate random numbers to prevent against replay attacks. For instance, inhibiting unauthorized users that reverse-engineer testers or ECUs using unique keys per vehicle or switching to an Authentication service may prevent attackers who aim to launch reply attacks due to the randomness of the challenge. But current implementations of the UDS SecurityAccess service typically use the ECU's current runtime as the source of randomness for producing a challenge. But an authorized user may subvert such strategies by forcing an ECU to reset its current runtime thereby reducing the randomness of the challenge. As attacks by unauthorized users increase, improved methods may be needed for generating the randomness in ECUs.

As such it may be desired for a system or method that can increase the strength of an ECU's random number generation and make it more difficult for an unauthorized user to pass authentication without the use of a Hardware Security Module (HSM) or a dedicated True Random Number Generator (TRNG). In contrast the system or method disclosed may not require additional hardware and may be implemented using currently deployed ECUs already operating within commercial vehicles. By implementing on currently deployed ECUs, the disclosed system and method may provide a cost saving solution.

Again, the disclosed system and method may be used in vehicles having a security protocol either within the vehicle or which communicates between the vehicle and an external system (e.g., other vehicles). While the system and method is disclosed using the UDS protocol, it is therefore contemplated that any other security protocol may be employed in a similar manner as discussed below.

For instance, if a vehicle employs the UDS protocol the present system and method may permit diagnostic testers the ability to communicate within vehicle ECUs. There may also be many different functions available using the UDS protocol and certain functions may only be available to a tester (i.e., an authorized user such as a service technician or mechanic) with higher privilege access. It is contemplated the tester may operate as a client who requests privilege access to an ECU. And the ECU may operate as a server in this example. The tester may begin by connecting a test device and communicating with the ECU over a known bus protocol such as the CAN bus. In the example of a vehicle connection, a test device may be connected using the On-Board Diagnostics (OBD) port. Once connected to the network, the tester may further authenticate itself by initiating the SecurityAccess service.

For instance, FIG. 1 illustrates a block diagram 100 of the UDS SecurityAccess service. A tester (i.e., "client") may be requesting security access from the ECU (i.e., "server") shown by the engine block 610. At block 110, the tester may request a challenge from the ECU. At block 112, the ECU may be operable to compute a challenge and send results of the computer challenge back to the tester. At block 114, The tester may compute a response with the encryption algorithm using the shared key and the received challenge as an input. At block 116, the ECU may compare the received response to the expected response using the same encryption algorithm and same inputs. The ECU may then either grant or deny the tester the requested access.

The SecurityAccess service may benefit from the use of symmetric key encryption which generally requires low processing power. The SecurityAccess service may also benefit from the use of an encryption algorithm which is generally understood as being secure based on its construction. It is contemplated vehicle OEMs may implement a variety of encryption algorithms that can change over various vehicle makes and models. It is possible to reverse engineer the algorithms being used by OEMs and weaknesses may be found in their implementation thereby allowing an unauthorized user the ability to implement a brute force attack against the authentication process.

As vehicle manufacturers began to move to implementing unique keys an ECU and also limiting access two keys by placing them in proprietary backends an unauthorized user may be faced with greater difficulty in launching a replay attack because the challenge may be more random. Since an unauthorized user may have limited amount of time to successfully attack a given vehicles ECU, the unauthorized user may not be able to initiate a brute force attack against the authentication. The ability to stop a brute force attack may be a result of the random challenge. Thus, the SecurityAccess services may be understood as relying on two facts: (1) an authorized tester may typically be the only person having access to the shared key an encryption algorithm, and (2) the challenge may generally be random enough to prevent a replay attack from an unauthorized user that simply observes network traffic and prior SecurityAccess exchanges. Again, it should be noted that the same observations may apply to other known security protocols that employ a challenge/response.

It is therefore contemplated the vulnerability of most attacks may focus on the randomness of a challenge and how it may impact the security of the SecurityAccess service. Current ECU's and firmware generally use the current runtime as a source of randomness when producing the requested challenge. The encryption algorithms may therefore begin the challenge generation function with the current ECU runtime and perform functions on this value. For instance, the encryption algorithms make implement functions such as a permutation or shift. It is generally understood that ECU designers may use the current runtime as the source of randomness since these ECUs are lower cost and lower processing devices as compared to other personal computer and server solutions. Also, these ECUs may not typically include a security module such as they trusted platform module (TPM) or hardware security module (HSM). Such security modules are known to provide dedicated strong random number generators but also increase the cost and complexity of a system. As such, obtaining a more secure random number may not be easily achieved in current runtime as they provide minimal or no randomness in low cost and low processing ECUs. For instance, the current runtime may provide a minimum amount of randomness for the low-cost and low-processing ECUs used within certain applications like automotive vehicles.

However, an unauthorized user with knowledge of chosen source of randomness for these ECUs Could result in the control of the current runtime of the ECU. For instance, by examining the list of unprivileged commands that may be accessible to a device connected on the CAN bus the ECUReset service may permit a device the ability to request an ECU into a hard reset.

Figure 2:
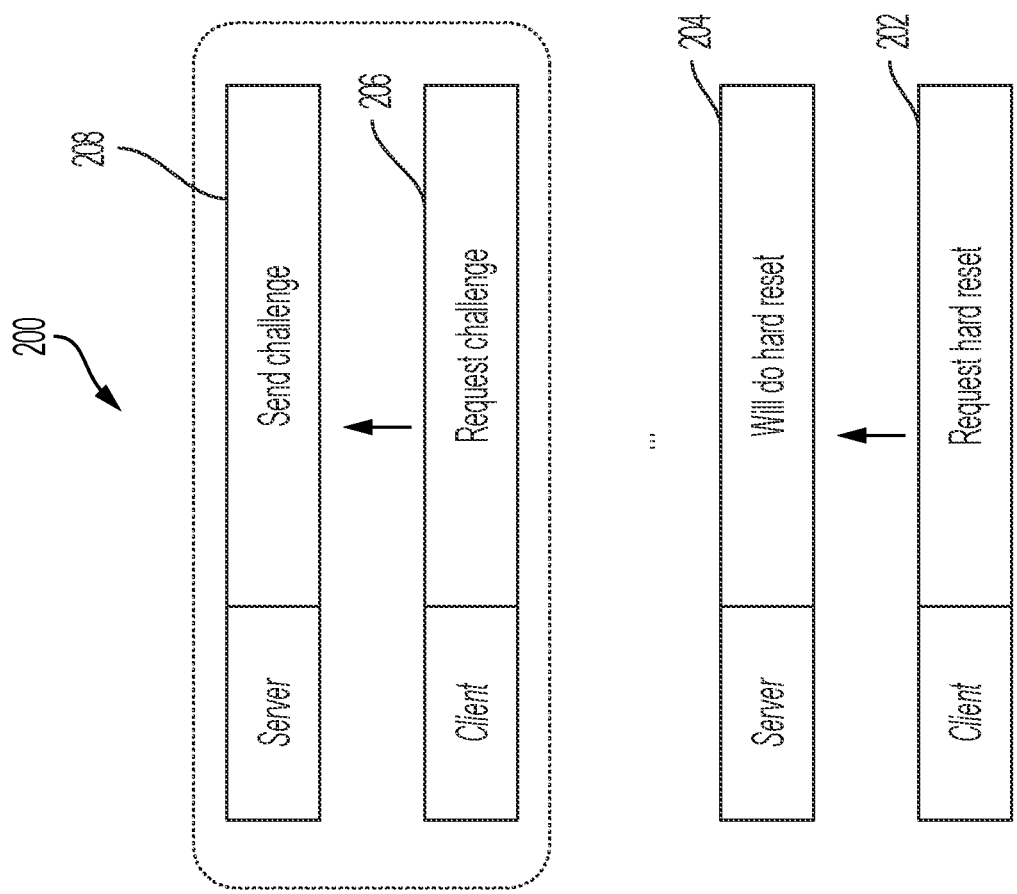
FIG. 2 is an exemplary flow diagram for a hard reset request.

FIG. 2 is an exemplary flow diagram 200 illustrating forcing an ECU to repeat challenges using a hard reset request followed by a series of other UDS commands. The commands may be precisely timed between each request. Flow diagram 200 may begin by first requesting a hard reset and then requesting a challenge to initiate the SecurityAccess service. At block 202, a client (i.e., unauthorized user) may request the hard reset of the ECU. In response, at block 204 the ECU (i.e., server) may initiate a hard reset. After completion of the hard reset, at block 206 the client may begin the request challenge. At block 208 the server may send the challenge.

It is contemplated, that the attack illustrated in FIG. 2 may be refined by requesting the ECU to enter a diagnostic state prior to the hard reset. By entering a diagnostic state, the unauthorized user may be allowed to achieve a repetition rate of a challenge in the double digits. Good random numbers may be essential for any security mechanism including ECUs operating within a vehicle. Also, such mechanisms may require good sources of randomness and some vehicle applications include various forms of security randomness. For instance, vehicle applications that include sources of randomness are generally employed in the challenge response protocols by: (1) key fobs to grant access to a vehicle, (2) security protocols when connecting to cloud services, (3) pairing devices inside the car, and (4) authentication within nodes in a vehicle, (5) communication with other vehicles (e.g., Car2Car communication) or with (intelligent, transportation) infrastructure.

Again however, the chance of getting the same challenge within a vehicle ECU may be quite frequent. For instance, FIG. 3 illustrates a first chart 300 and second chart 302. It is contemplated that after requesting 1000 challenges there is a 25% chance the ECU may respond with the same challenge. The expected chance of getting the same challenge may be 1 out of $2^{24}$ for the ECU within vehicle 1 and one out of $2^{32}$ for the ECU within vehicle 2.

Because the challenge may not be random using various sets of commands the SecurityAccess service may not be able to prevent replay attacks. It is therefore possible then unauthorized user may be able to observe a valid authentication including a unique challenge and its expected response. For example, an unauthorized user may be able to compromise in-vehicle ECUs by monitoring the bus activity (e.g., CAN bus). The unauthorized user may be able to continue such a compromise until a software update is released by the vehicle manufacturer or dealer technician. It is contemplated the unauthorized user may also force the ECU to reproduce the same challenge thereby providing the ability to simply send the observed response and pass authentication. But, this type of attack may only reproduce a specific set of challenges instead of any challenge as discussed above.

It is contemplated an unauthorized user who monitors the bus during a valid authentication may be able to capture a challenge response pair. The unauthorized user may refine this type of attack to force the ECU to produce a particular challenge instead of just a specific set of challenges. It is understood, the unauthorized user may also be able to change the delay time between the hard-reset request time and the challenge request time to get additional or different challenges to appear. With sufficient time and access of the target ECU, an authorized user may be able to map how much delay time is required to produce any given challenge. The unauthorized user may use this knowledge once it observes a valid authentication on the compromised vehicle and the unauthorized user may use this measured delay time to launch a replay attack.

Since the challenge generation process may not be unique to an ECU as it generally does not rely on any unique ECU key, the unauthorized user may be able to learn the delay time mapping offline and then compromise any vehicle using current runtime as a source of randomness. It is contemplated the delay time may be the runtime used by current ECUs which may be operative to derive random challenges. In other words, the current runtime delay may be understood as being the time required to perform an operation in a given ECU which may typically be a bad source of randomness. The delay time may not be the time required to transmit messages over the CAN network (which the present system and method are operable to protect). Instead, the variable network delay over a CAN network may employ the intrinsic random variability induced by the physical CAN bus, which may be more difficult to predict and therefore include a more secure randomness property.

After gaining privileged access by passing authentication through the SecurityAccess service, the unauthorized user may be able to access privileged commands that include reprogramming a vehicle ECU for the purpose of launching an advanced persistent threat (APT) attack or even using this compromised ECU to launch other more advanced or sophisticated attacks.

In addition to the UDS SecurityAccess service it is contemplated that the challenge response authentication is generally also used for the UDS Authentication service. The Authentication service is generally understood as requiring a public key infrastructure (PKI) which is a more costly but also a more secure alternative to SecurityAccess. The Authentication service may require an ECU to have sufficient processing to handle asymmetric encryption and require the usage of security certificates. However, despite the use of PKI and its cryptographic primitives the Authentication service generally uses a challenge response as part of the authentication steps. The target ECU may send a challenge to the tester which may compute the appropriate signed response. If the unauthorized user can control the plain-text challenge, they may be able to launch a replay attack. It is therefore possible that similar vulnerabilities as those discussed above may occur for the Authentication Service if the current runtime is also used as a source a randomness.

Given the weakness in the current runtime-based source of randomness used by most vehicle ECUs it is understood an additional or different source of randomness may be desirable. It is contemplated that the source of randomness should be sufficient for UDS SecurityAccess services and Authentication services to potentially replace functionality of the RNG from an onboard HSM. Also, a low-cost ECU should not be required to include an HSM and can instead rely and the new sources of randomness for cryptographic implementations. As discussed below, some form of randomness may include: (1) response time-based randomness; (2) power-based randomness; and (3) random walk-based randomness.

For instance, for controllers, processors, or modules (e.g., ECUs) used within an automotive vehicle, improved sources of randomness are desired when used as a seed for encryption algorithms. Improved methods and systems may provide stronger sources of randomness than the current source of randomness, which is current runtime, typically used within vehicle ECUs. The disclosed methods and systems may be applied as a source of randomness for other security-related activities on an ECU in addition to UDS SecurityAccess. It is contemplated the methods may require little or zero change to the existing hardware of an ECU already deployed within a vehicle and therefore may be implemented through software updates or changes. It is also contemplated the methods and systems may be operable to create an entropy pool, which may then operate as input to any number of random number generators (including PRNGs). Lastly, the methods and systems may be applicable to a variety of systems that utilize nodes with similar capabilities as in-vehicle ECUs, such as aerospace systems, industrial control systems, and building control technologies.

It is further contemplated the disclosed methods and systems of attack may utilize the predictability and controllability of an ECU's current runtime to launch a replay attack to pass authentication and may not require access to the shared key or encryption algorithm. For instance, an attacker (i.e., unauthorized user) may attempt to reduce the source of randomness for a target ECU with the goal of increasing the likelihood of attack success. Having the ability to authenticate with a target ECU, the attacker may be able to launch further attacks. Such attacks may include reprogramming, misconfiguring, or disrupting the target. Independent of an eventual attack goal, initial steps that may need to be exercised within the CAN bus may include (1) the hard reset of the target ECU; and (2) the appropriate timing of messages to invoke a repeated challenge. If an attacker initiates these steps, the attacker may be successful at enabling a replay attack.

But several countermeasures can be designed to prevent the attacker's ability to express control of the current runtime. Again, it is contemplated such countermeasures may include improved sources of randomness that can decrease an attacker's ability to launch a replay attack. While these improved sources may be implemented within ECUs operating within deployed vehicles, it is also contemplated the disclosed sources of randomness may also be employed within the design stage of ECUs prior to being deployed.

Figure 4A:
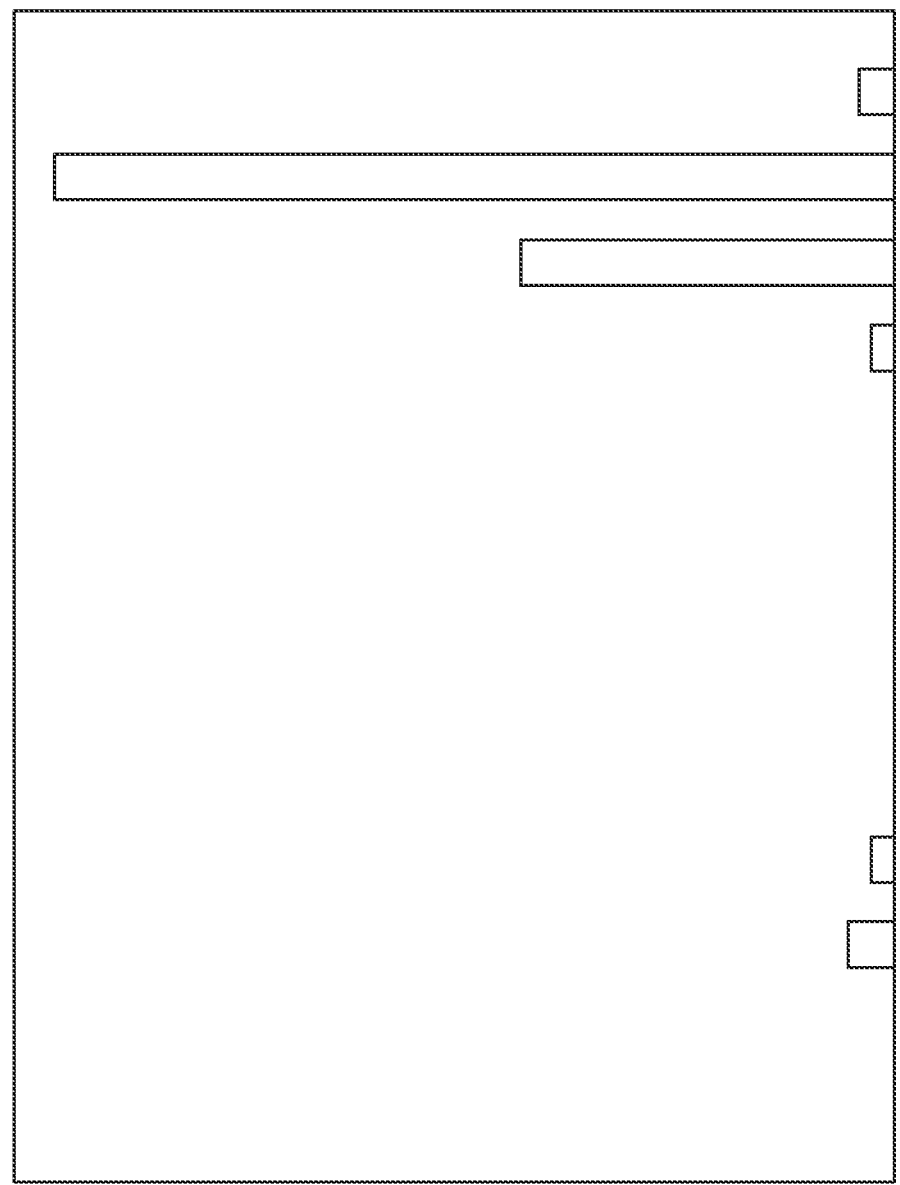
FIGS. 4A-4C are exemplary graphs illustrating potential response time distributions.
Figure 4B:
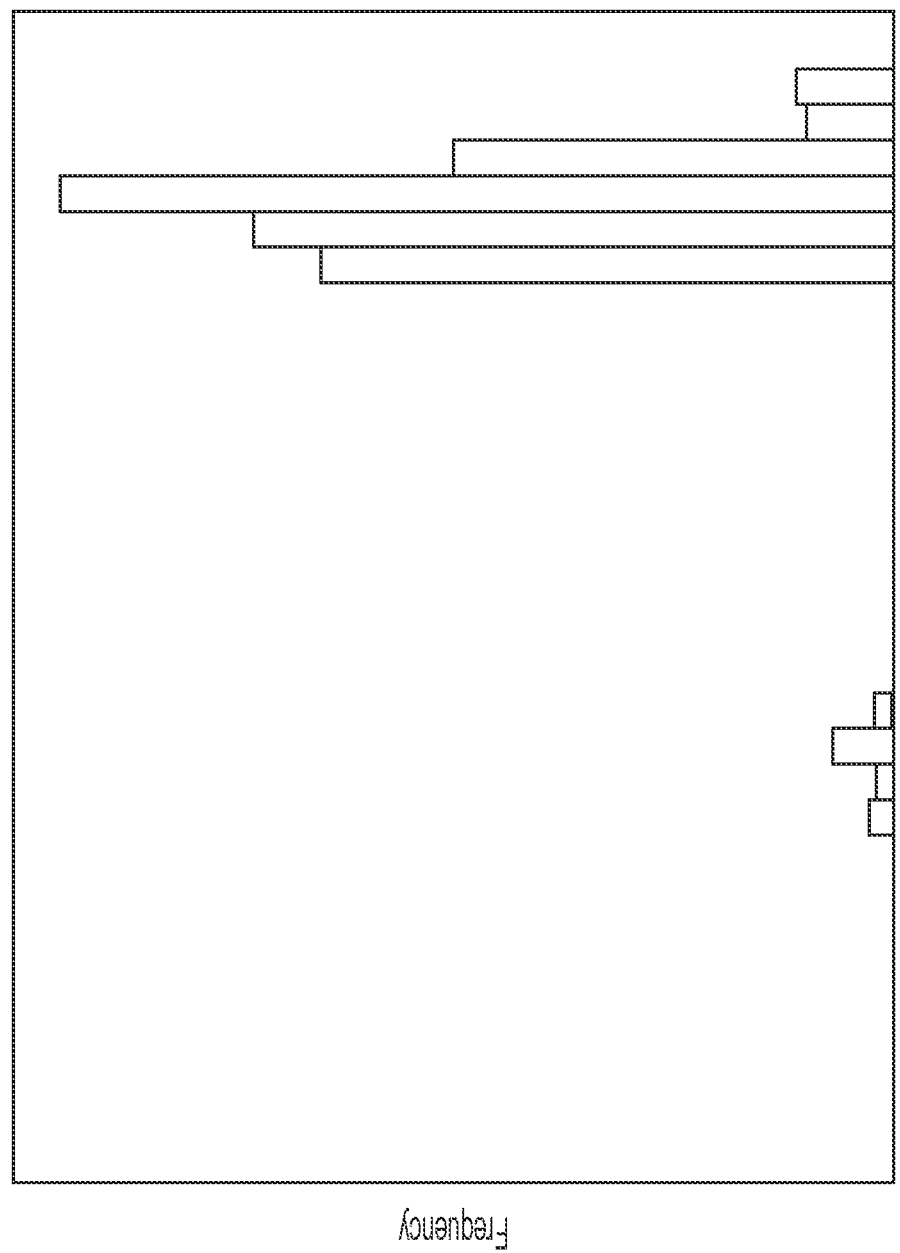
Figure 4C:
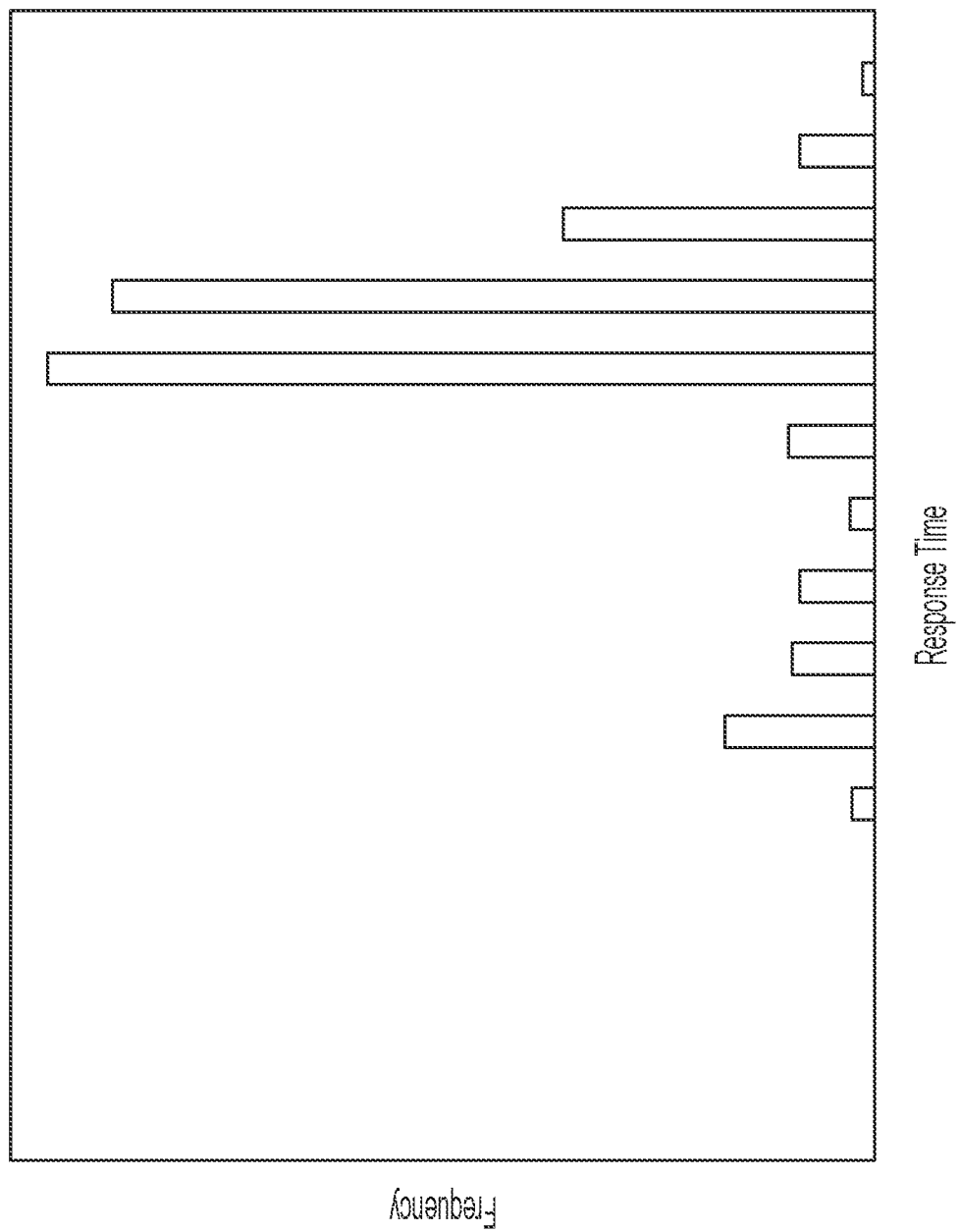

FIG. 4A-4C illustrate exemplary graphs 400, 402, 404 depicting the response times between the request and response along the x-axis and the frequency of a given measured response time along the y-axis. It is contemplated the response time distribution for graphs 400-404 may be representee of UDS message request and/or response pairs. As illustrated, the response time for a vehicle ECU pertaining to certain diagnostic messages (e.g. challenge-response messages) may follow a multi-modal normal distribution. Graph 400 is an exemplary graph depicting a challenge request/response, graph 402 is an exemplary graph depicting a diagnostic session request/response, and graph 404 is an exemplary graph depicting a hard-reset request/response.

Based on current vehicle ECUs and the response to messages (as illustrated by FIGS. 4A-4C), it is contemplated a strong source of randomness may be generated by obtaining a source that produces a normal distribution (or some other distribution) and convert the source into a uniform distribution. By isolating one mode of distribution, it may be possible to extract a single normal and use known techniques and algorithms to produce a uniform distribution. It may also be possible to use a natural characteristic of a vehicle ECU's response time to certain messages without having to add new hardware for generating a random number. It is contemplated the response time measurements may provide sufficient randomness if the result provides a given level of entropy. The quality of the random numbers generated using a response time-based source of randomness may also be measured using the converted distribution. The response time-based source of randomness may also provide a given level of security if the original distribution to the converted distribution results in a sufficient amount of randomness.

Figure 5:
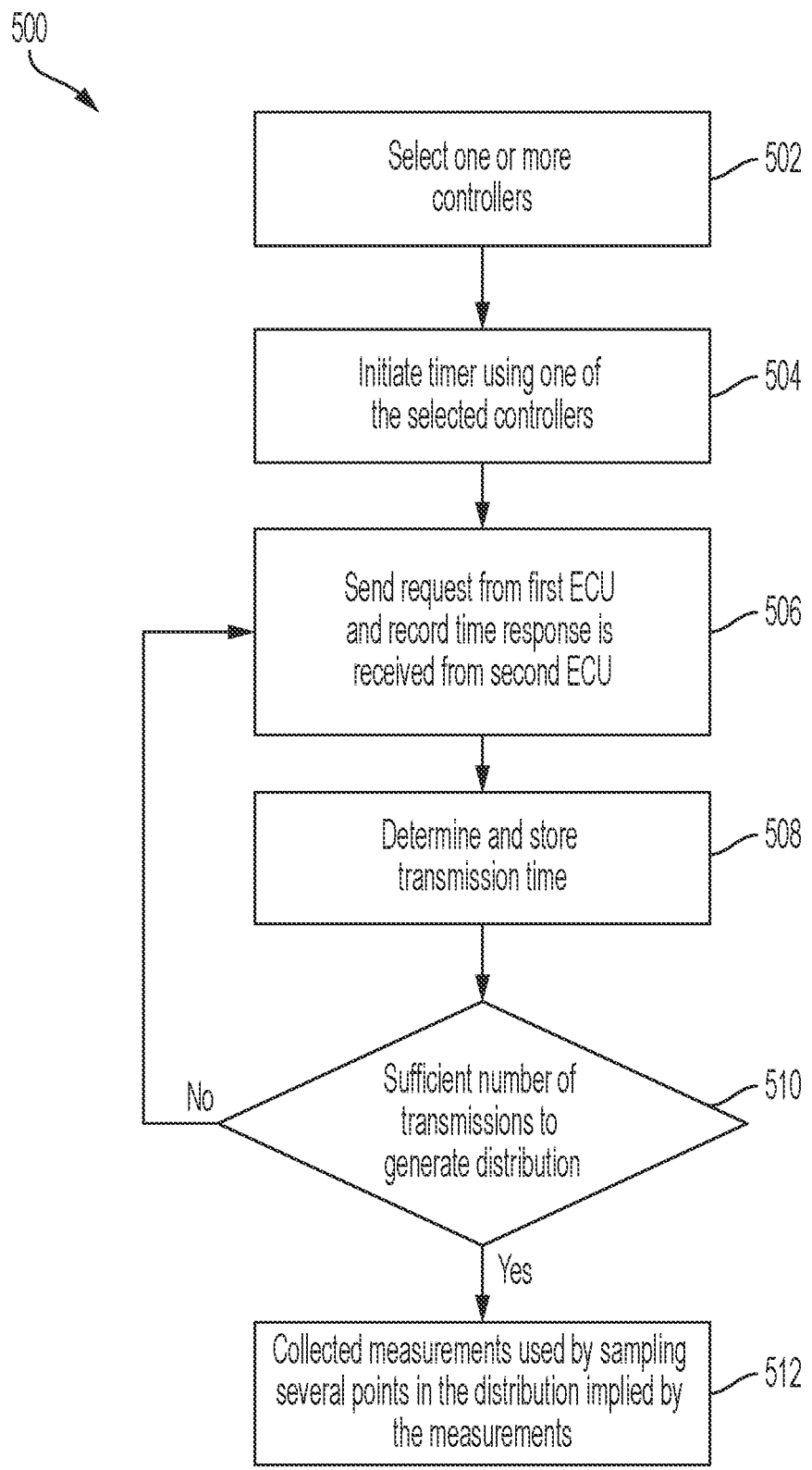
FIG. 5 is an exemplary flow diagram for implementation of a response time-based source of randomness

FIG. 5 illustrates a flow diagram 500 for implementing a response time-based distribution as a source of randomness. At step 502, a first ECU (i.e., ECU_1) and second ECU (i.e., ECU_2) may be selected. The first ECU may be selected to operate as the SecurityAccess server. The first ECU may then operate to generate a challenge with sufficient randomness using this new source. The second ECU may then be operable to respond to a message from the first ECU.

At step 504, the first ECU may initiate a timer such as a watchdog, hardware timer or any other available timer that may include sufficient timing resolution. The timer may be used to record the transmission of a request message sent by the first ECU and when a response message is received by the first ECU from the second ECU. For instance, at step 506 the first ECU may send a request message to the second ECU and record the time the request message is sent. The first ECU may then wait and record the arrival time of a response message received from the second ECU.

At step 508, the first ECU may then subtract the request message transmission time from the response message arrival time and store the difference value within a memory associated with the first ECU. At step 510, the first ECU may determine if a sufficient number of timing measurements have been collected to produce a distribution. If no, flow diagram 500 may return to step 506. It is contemplated that 300 to 800 measurements may be sufficient to produce a normal distribution when the first ECU requests a challenge, and the second ECU responds with a challenge. It is also contemplated the type and characteristics of the calculated distribution may vary depending on the requested response.

If flow diagram 500 determines at step 510 that enough transmissions have been collected, flow diagram 500 may proceed to step 512 where the first ECU may use the collected measurements by sampling several points in the distribution implied by the measurements. The first ECU may further use these points as the input seed to a Pseudo-random Number Generator (i.e., PRNG) or as a randomness extractor (e.g., such as a universal hash function). It is contemplated the output of either function may be used as the challenge for the UDS protocol.

Additionally, a voltage-based source of randomness may be used to generate pseudo-random numbers. The strong source of randomness may be generated by creating an entropy pool. The values that make up an entropy pool may be difficult to reproduce, and the cryptographic algorithm that produces a random number from the entropy pool could in turn make reverse-engineering the pool difficult.

For instance, the source of noise in a vehicle may be used as the source of randomness as in-vehicle noise is difficult to reproduce (e.g., like keystrokes and mouse movement seen on operating systems). In current automotive-grade applications, microcontrollers (e.g., ECU) may be used to measure power usage using a shunt resistor and voltage measuring circuit. As such, the microcontroller may be operable to track its power utilization while the vehicle operates. Since the vehicle at a higher-level draws power for its electronics from an auxiliary battery (e.g., 12-V battery), the power from the auxiliary battery may change as the vehicle operates. For instance, the vehicle's auxiliary battery may have higher levels of power usage while the vehicle is accelerating or steering, while the vehicle headlights are operating, or while the vehicle A/C unit is operating. But it is contemplated that any other vehicle operation that requires power usage from the auxiliary battery may also be used. It is also contemplated, the voltage of a vehicle battery is a complex function that may vary based on the amount of current used by vehicle nodes, engine power production, battery state-of-charge, ambient temperature, and the age of electrical components, and the like.

It is therefore contemplated the instantaneous power measurements from an automotive vehicle may be used to build the entropy pool. The entropy pool may be used as part of a security mechanism. For instance, the entropy pool may be used as an input to a PRNG or the entropy pool may be used for hashing the pool values. It is understood that changes in the voltage over time may skew a distribution. As another example, a cryptographic hash algorithm (e.g., SHA-1 or SHA-2) may be employed to ensure a random number is produced thereby resulting in a very small chance of repetition.

An entropy pool may be constructed and a cryptographic algorithm may be used to generate a pseudo-random number. The algorithm employed may be a deterministic random bit generator (DRBG) that takes mixed entropy pool bytes and generates random bits. A SHA cryptographic hash (e.g., SHA-1) of the entropy pool may also be employed to further ensure the pseudo-random number maintains confidentiality.

It is contemplated the voltage-based source of randomness helps prevent an unauthorized user from reproducing a similar entropy pool. It is also contemplated that a portion of the randomness from voltage measurements may come from the way a particular user drives and operates an automotive vehicle. Based on the uniqueness of how a driver operates a vehicle, the voltage measurements may capture these differences assuming enough entropy and high enough resolution.

Figure 6:
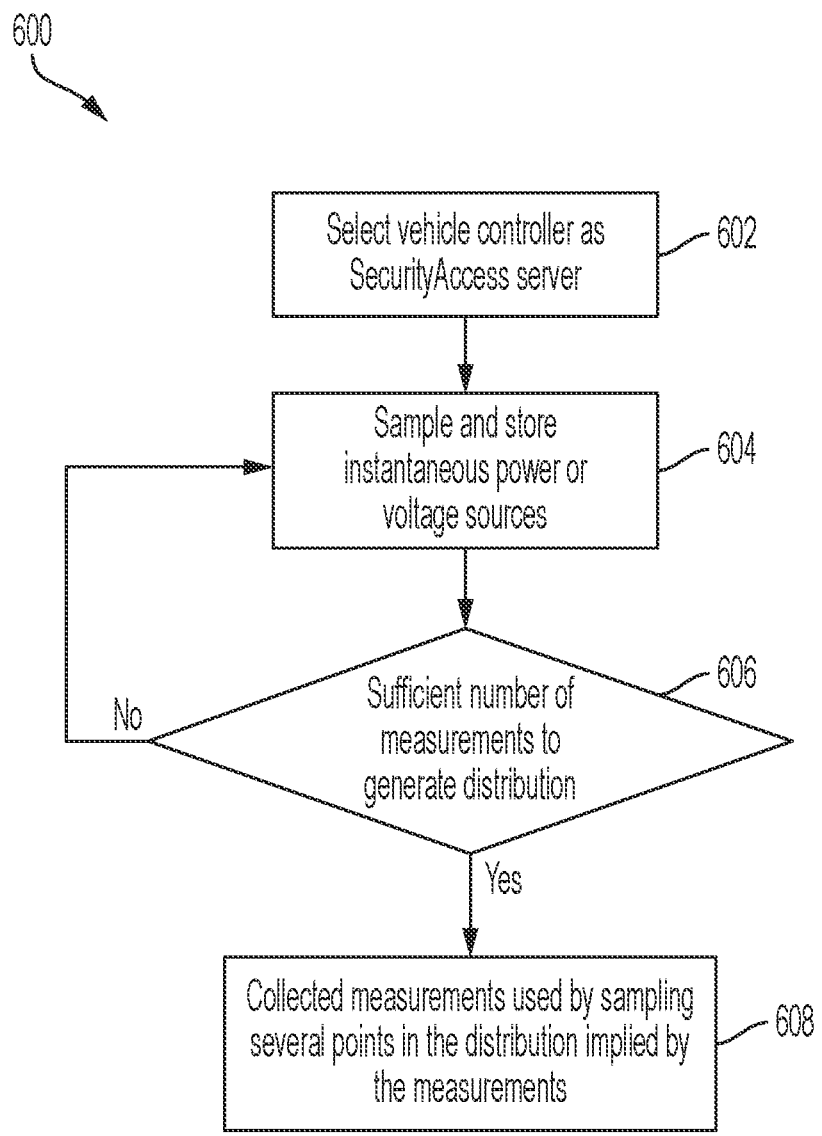
FIG. 6 is an exemplary flow diagram for implementation of a voltage-based source of randomness.

FIG. 6 is an exemplary flow diagram 600 for implementing voltage-based measurements over time as a source of randomness. At step 602 a first ECU (ECU_1) may operate as the SecurityAccess server. The first ECU may be operable to generate a challenge with sufficient randomness using voltage-based measurements described above. At step 604 the first ECU may sample and store the instantaneous power or voltage of one or more sources within the vehicle. For instance, the first ECU may sample the power or voltage of the vehicle battery, a given ECU, or microcontroller. At step 606 the first ECU may determine if a predetermined number of voltages/powers have been collected to produce an entropy pool. If no, flow diagram 600 returns to step 602. If yes, flow diagram 600 proceeds to step 608 where the first ECU may use the collected measurements by sampling several points in the distribution implied by the measurements. It is contemplated the points sampled may then be used as the input seed to a PRNG or a randomness extractor (e.g., a universal hash function). The output of either function may also be used as the challenge for the UDS protocol. Lastly, it is contemplated the storage of the entropy pool and its characteristics can and may change depending on the measured power or voltage source.

It is contemplated, however, the entropy pool may be derived from a combination of the systems and methods discussed throughout the application and is not limited to the flow diagram illustrated by FIG. 6. For instance, the entropy pool may be derived from a combination of the voltage and timing and is not limited to being derived from just timing or just voltage. It is also contemplated the entropy pool may be derived more generally from other potential sources like sound within or outside the vehicle, vibrations, or other physical occurrences. Lastly, the entropy pool might be derived from reading a value previously stored in memory (e.g., from a previous session).

As previously discussed, a potential vulnerability may exist due to an unauthorized user's ability to force a target ECU to reproduce duplicate or similar challenges multiple times. Again, this repeatability may originate from the weak source of randomness, which can be controlled by an unauthorized user (i.e., attacker) thereby ensuring the random number generated is seeded with the same initial value for a given challenge. The prior approaches discussed above may be operable to strengthen the source of randomness by limiting the attacker's ability to control the source of randomness. A final approach to strengthen the source of randomness may be accomplished by ensuring the source only produces the same output after a very long time and that each next output may be difficult to predict. This approach is intended to prevent the same challenge from repeating with a predetermined level of frequency.

Figure 7:
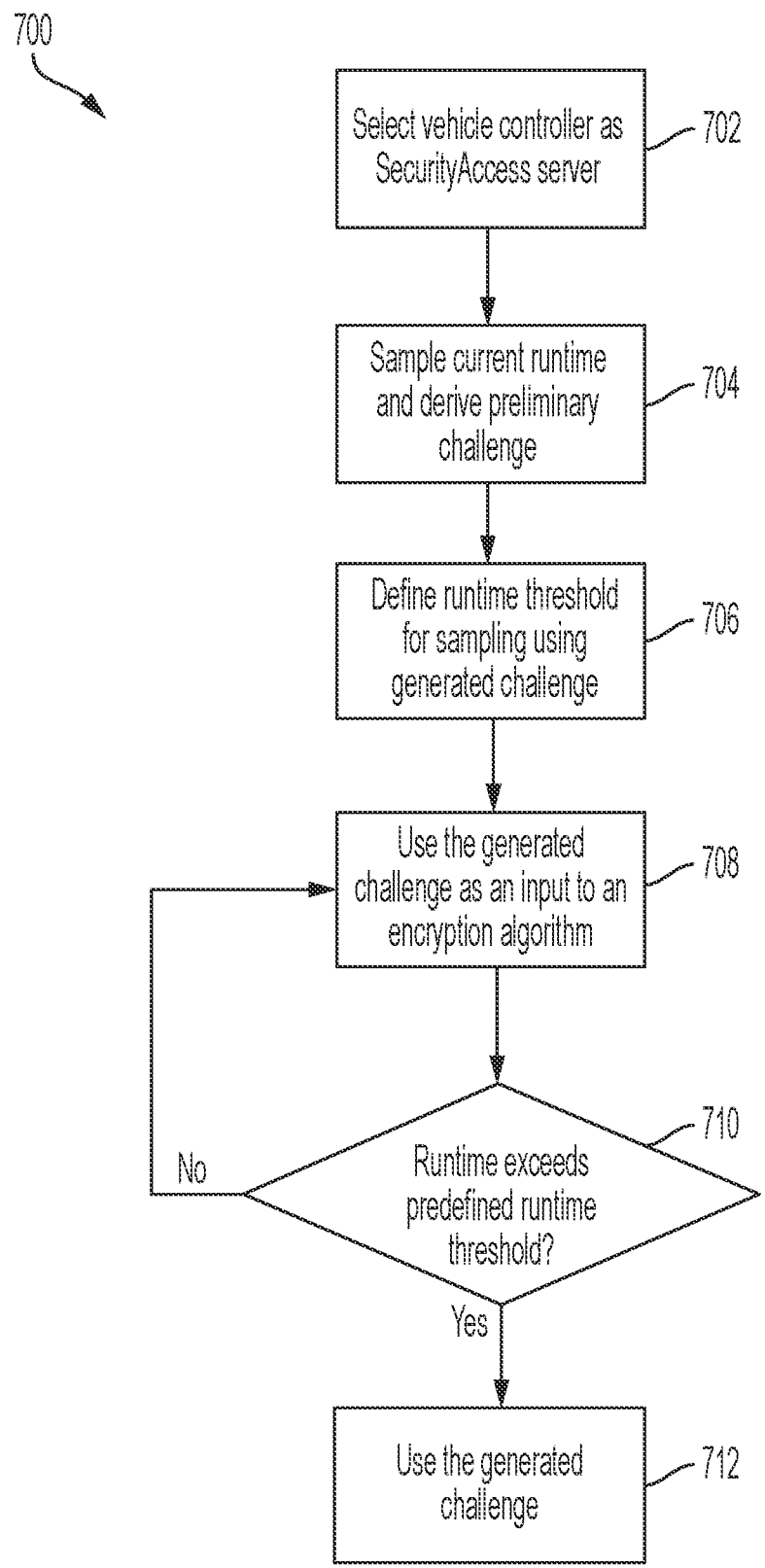
FIG. 7 is an exemplary flow diagram for implementation of a random walk-based source of randomness.

FIG. 7 is an exemplary flow diagram 700 for implementing a mechanism that may increase the difficulty for an attacker to force a challenge to repeat. Flow diagram 700 begins at step 702 where a first ECU (i.e., ECU_1) may operate as the SecurityAccess server. The first ECU may be required to generate a challenge with sufficient randomness using this new source. At step 704, the first ECU may sample the current runtime and may derive a preliminary challenge. It is contemplated an unauthorized user may be able to have control over the preliminary challenge. To help prevent such unauthorized use, at Step 706 the generated challenge may be used to define a number of runtimes for sampling. The original and/or each newly acquired value may then be stored within memory associated with the ECU for future use. At step 708, the first ECU may use the generated challenge as an input to an encryption algorithm to make it less likely for an attacker to control the resulting challenge. At step 710, the algorithm may determine whether the sampling of the current runtime has exceeded the previously defined runtime threshold. If no, flow diagram 700 may return to step 708. If yes, flow diagram 700 may determine to use the generated challenge.

It is contemplated that the disclosed random walk-based source of randomness may prevent unauthorized access as an attacker may have less control over the sampling. Less control is due to the fact there may be more variability in the timing due to the challenge requests being repeated. Also, although the random walk-based approach may require more processing power and time to complete as it samples current runtime repeatedly before sending the final challenge on the bus, the SecurityAccess service may be used just once to give authorized users privileged access for an entire session. It is also contemplated the random walk-based approach may be computationally improved by storing the last transmitted challenge prior to sending it on the CAN bus and then use an algorithm that produces pseudo-random numbers based on this challenge.

For instance, a linear congruential generator (LCG) algorithm may be employed where the last transmitted challenge may be employed as the start value (or seed). However, other known algorithms (e.g., linear feedback shift register (LFSR)) may also be employed. The LCG algorithm should be configured so that it has a maximum period length. Stated differently, the LCG algorithm may only repeat the same challenge once after all other challenges have been transmitted. This approach may also require a non-volatile storage medium (e.g., ROM memory, hard disk, NAND memory, a register, or the like) to store the last used challenge either in plaintext or as a hash. To ensure that this approach may not be susceptible to exploitation, the target ECU should compute the challenge and store it in non-volatile memory prior to sending the challenge to the tester over the bus.

Lastly, it is contemplated the various methods for generating random numbers may be combined together using a single function and a seed may then be derived from the combined functionality using other various methods described (e.g., randomness extractor, hash function, crypto algorithm, etc.). The combination function implemented may be a logical expression such as an "XOR," "AND," or "OR."

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of generating a random number to prevent unauthorized access to an application-layer communication protocol within a vehicle, comprising:
    selecting a first controller within the vehicle as a security server;
    selecting a second controller within the vehicle that is in operable communication with the first controller over a shared bus network;
    transmitting a plurality of request messages from the first controller over the shared bus network to the second controller;
    transmitting a plurality of response messages over the shared bus network from the second controller to the first controller in reply to the plurality of request messages;
    calculating a plurality of transmission times via the first controller based on a difference between a start time when each of the plurality of request messages is transmitted by the first controller and a completion time when the plurality of response is received by the first controller;
    generating a statistical distribution of the plurality of transmission times; and
    selecting one or more of the transmission times within the statistical distribution as an input seed to a cryptographic algorithm operable to generate the random number.

2. The method of claim 1, wherein the application-layer communication protocol is a Unified Diagnostic Service protocol.

3. The method of claim 2, wherein the first controller is configured to operate as a SecurityAccess server.

4. The method of claim 1, wherein the cryptographic algorithm is a pseudorandom number generator.

5. The method of claim 1, wherein the cryptographic algorithm is a randomness extractor.

6. The method of claim 1, wherein the statistical distribution is a normal distribution.

7. The method of claim 6, further comprising: isolating one mode of the normal distribution to extract a single normal; and converting the single normal to a uniform distribution.

8. The method of claim 1, further comprising: providing the random number as a challenge when access is being requested through the application-layer communication protocol.

9. The method of claim 1, wherein each transmission time of the plurality of transmission times is different than at least one other transmission time of the plurality of transmission times.

10. The method of claim 1, wherein each transmission time of the plurality of transmission tunes is different than each of the other transmission times of the plurality of transmission times.

11. A method of generating a random number to prevent unauthorized access to an application-layer communication protocol within a vehicle, comprising:
    selecting a first controller as a security server;
    selecting a second controller that is in operable communication with the first controller;
    transmitting a plurality of request messages from the first controller to the second controller;
    transmitting a plurality of response messages from the second controller to the first controller in reply to the plurality of request messages, wherein the plurality of response messages and the plurality of request messages form corresponding pairs of messages;
    measuring transmission times of each of the corresponding pairs of messages via the first controller based on a difference between a start time when the request message within each pair of messages is transmitted by the first controller and a completion time when the response message within each pair of messages is received by the first controller;
    generating a statistical distribution of the transmission times; and
    selecting one of the transmission times from the statistical distribution as an input seed to a cryptographic algorithm operable to generate the random number.

12. The method of claim 10, wherein the application-layer communication protocol is a Unified Diagnostic Service protocol.

13. The method of claim 11, wherein the first controller is configured to operate as a SecurityAccess server.

14. The method of claim 10, wherein the cryptographic algorithm is a pseudorandom number generator.

15. The method of claim 10, wherein the cryptographic algorithm is a randomness extractor.

16. The method of claim 10, wherein the statistical distribution is a normal distribution.

17. The method of claim 16, further comprising: isolating one mode of the normal distribution to extract a single normal; and converting the single normal to a uniform distribution.

18. The method of claim 10, further comprising, providing the random number challenge when access is being requested through the application-layer communication protocol.

19. The method of claim 10, wherein each transmission time of the transmission times is different than at least one other transmission time of the transmission times.

20. The method of claim 10, wherein each transmission time of the transmission times is different than each of the other transmission times of the transmission times.

* * * * *